(12) United States Patent
Fabrizi et al.

(10) Patent No.: US 7,714,237 B2
(45) Date of Patent: May 11, 2010

(54) ELECTRICAL APPARATUS AND SUPPORTING FRAME FOR WALL-MOUNTING SAME

(75) Inventors: Fabrizio Fabrizi, Bergamo (IT); Ennio Calderara, Cuasso Al Piano (IT); Renato De Ambroggi, Cocquio Trevisago (IT)

(73) Assignee: BTICINO S.p.A., Milan (IT)

( * ) Notice: Subject to any disclaimer, the term of this patent is extended or adjusted under 35 U.S.C. 154(b) by 319 days.

(21) Appl. No.: 11/914,503

(22) PCT Filed: May 4, 2006

(86) PCT No.: PCT/IT2006/000312

§ 371 (c)(1),
(2), (4) Date: Dec. 12, 2007

(87) PCT Pub. No.: WO2006/123379

PCT Pub. Date: Nov. 23, 2006

(65) Prior Publication Data

US 2008/0257601 A1    Oct. 23, 2008

(30) Foreign Application Priority Data

May 17, 2005    (IT)    ............... RM2005A0241

(51) Int. Cl.
*H01R 13/502*    (2006.01)
(52) U.S. Cl. .................. 174/563; 206/716; 361/809; 361/829
(58) Field of Classification Search .......... 361/752, 361/809, 829; 174/559, 563; 206/708, 716
See application file for complete search history.

(56) References Cited

U.S. PATENT DOCUMENTS 4,324,330 A * 4/1982 Durney ............... 206/708
4,485,282 A   11/1984 Lee
4,506,785 A * 3/1985 Seefeldt ............. 206/708

(Continued)

FOREIGN PATENT DOCUMENTS

DE    296 00 813 U1    2/1996

(Continued)

OTHER PUBLICATIONS

PCT/IT2006/000312, PCT International Search Report and Written Opinion, Sep. 13, 2006, 8 pages.

(Continued)

*Primary Examiner*—Hung V Ngo
(74) *Attorney, Agent, or Firm*—Hogan & Hartson LLP

(57) ABSTRACT

An electrical apparatus that can be fixed to a supporting frame having a mounting window to receive the electrical apparatus includes a main body having a substantially box-like shape and first fixing elements provided on first and second opposite sides of the body to engage with corresponding second fixing elements the frame and facing the mounting window. The first fixing elements include guiding fixing elements to permit axial and guided sliding of electrical apparatus with respect to the frame in inserting the apparatus into the mounting window. The first fixing elements further include snap-in fixing elements to block axial sliding of the electrical apparatus with respect to the frame once a predetermined snap-in position has been reached.

18 Claims, 5 Drawing Sheets

U.S. PATENT DOCUMENTS

| | | | | |
|---|---|---|---|---|
| 4,527,222 A | * | 7/1985 | Swingley, Jr. | 361/797 |
| 6,606,248 B2 | * | 8/2003 | Matthews | 361/752 |
| 7,615,711 B2 | * | 11/2009 | De Ambroggi et al. | 174/520 |
| 2008/0179087 A1 | * | 7/2008 | De Ambroggi et al. | 174/559 |

FOREIGN PATENT DOCUMENTS

| | | |
|---|---|---|
| EP | 0 905 844 A2 | 3/1999 |
| EP | 0 989 648 A1 | 3/2000 |
| EP | 1 241 741 A1 | 9/2002 |
| FR | 2 856 202 | 12/2004 |

OTHER PUBLICATIONS

PCT/IT2006/000312, PCT International Preliminary Report on Patentability With Amended Claim Sheets, Sep. 13, 2007, 9 pages.

* cited by examiner

ELECTRICAL APPARATUS AND SUPPORTING FRAME FOR WALL-MOUNTING SAME

CROSS-REFERENCE TO RELATED APPLICATIONS

The present application is a national filing in the U.S. Patent & Trademark Office of PCT/IT2006/000312 filed May 4, 2006, and claims priority of Italy Patent Application No. RM2005A000241 filed May 17, 2005, both of which applications are incorporated herein in their entireties by this reference.

FIELD OF THE INVENTION

The present invention relates to the technical sector of electrical systems for houses and offices and, more particularly, relates to an electrical apparatus and a supporting frame for wall-mounting of said electrical apparatus.

BACKGROUND OF THE INVENTION

For the purposes of this description, electrical apparatus will mean, in general, any electrical means or device whatsoever generally forming part of electrical installations in civil buildings and similar and usually intended to be mounted, for example built-in, on the walls of said buildings.

Therefore, this definition includes, but is not limited to, switches, power supply sockets, data network sockets, TV sockets, telephone sockets, pushbutton switches, change-over switches, regulating electrical devices in general, connectors, thermostats, timers, fuse-holders, ringers/buzzers, emergency lights for example removable, signaling lights for example step lights, displays for example LCD and similar.

As is known, many of the above-mentioned electrical apparatuses are usually installed on the walls using composite mounting structures, or groups of parts, generally including:

a box intended to be inserted into the wall;

an apparatus-holding mounting frame (or supporting frame) which can be fixed to the box and comprising a frame body surrounding an opening defining a mounting seat suitable to receive and hold one or more electrical apparatuses; and a removable covering plate which can be fixed to the frame and provided with an opening so that the user can access, visually or manually, the electrical apparatuses installed on the supporting frame.

Various systems are known in the state of the art to fix an electrical apparatus to a supporting frame in such a way that it can be removed. For example, it is known to provide flexible tongues on two sides of the supporting frame opposite the mounting seat and suitable to engage with respective rigid teeth provided on opposite sides of an electrical apparatus intended to be fixed to the supporting frame. Said tongues must be sufficiently flexible to allow smooth attachment/detachment between the electrical apparatus and the supporting frame and, at the same time, they must be sufficiently rigid to guarantee adequate holding between the electrical apparatus and the supporting frame.

For this reason, the above-described fixing system of the prior art, even if widely used, in some cases presents a problem of fragility of the flexible fixing tongues, in other cases it is not such as to prevent accidental and unwanted detachment of the electrical apparatus from the supporting frame or dislodging of the electrical apparatus into the supporting frame and, therefore, towards the inside of the box built into the wall.

SUMMARY OF THE INVENTION

The object of the present invention is to provide an electrical apparatus which uses an innovative system for attachment to a supporting frame and which makes it possible to overcome the above-described disadvantages with reference to the prior art.

Said object is reached by means of an electrical apparatus as described in the attached claim 1. Preferred embodiments are defined in the dependent claims.

A supporting frame as defined in the attached claim 10 is also object of the present invention.

BRIEF DESCRIPTION OF THE DRAWINGS

Further features and advantages of the present invention will become more apparent from the following detailed description of an exemplary but non-limiting embodiment thereof, as illustrated in the accompanying drawings, in which.

In the figures, equal or similar elements will be indicated with the same reference numbers.

DETAILED DESCRIPTION OF PREFERRED EMBODIMENTS

Figure 1:
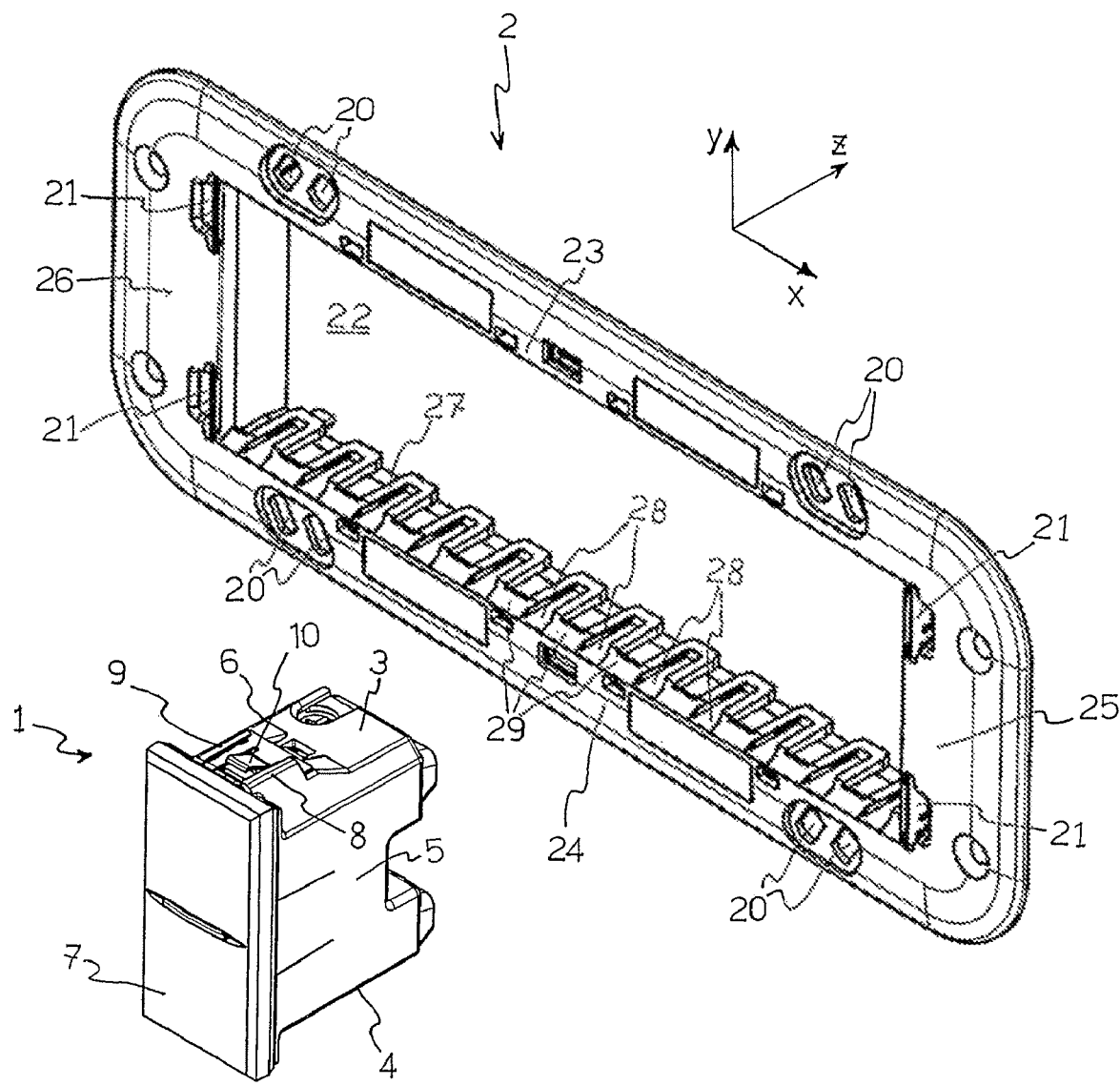
FIG. 1 is an axonometric view and in detached parts of an array composed of a supporting frame and an electrical apparatus according to the present invention.

FIG. 1 shows an array composed of an electrical apparatus, globally indicated with 1, according to the present invention and a supporting frame, globally indicated with 2, for wall mounting of the electrical apparatus 1.

In the embodiment shown, the electrical apparatus 1 is represented, for exemplary but non-limiting purposes, as a pushbutton switch 1. The pushbutton switch 1 comprises a box-like support structure, or main body, in insulating material, for example plastic, preferably having, but not limited to, an approximately parallelepiped shape with two pairs of lateral walls, respectively minor 3,4 and major 5,6. The box-like structure, which has an internal space not visible in the figure, is closed on the front by a pushbutton 7 for controlling the switch 1. The electrical apparatus 1 further includes fixing elements 8, 9, 10 provided on two opposite sides 3, 4 of the box-like structure, for fixing the electrical apparatus 1 to the supporting frame 2. In FIG. 1, only the fixing elements 8, 9, 10 are visible arranged on the lateral wall 3 of the electrical apparatus 1. However, it should be considered that identical fixing elements, not visible in the figure, are also provided on the lateral wall 4 of the electrical apparatus 1. In particular, the fixing elements 8, 9, 10 include, for each minor wall 3, 4 of the box-like container, two inclined and distanced rigid tongues 8 and 9, and a flexible tooth 10 placed between said tongues 8, 9. One end of the flexible tooth 10 is fixed to the electrical apparatus 1 and the opposite end is free. Preferably, the free end of the tooth 10 is a slightly curved end.

The supporting frame 2, for mounting the electrical apparatus on the wall, includes means to be fixed to the wall, for example it includes through-holes 20 which pass through the frame 2. Preferably, said holes 20 are in slots and are such as to receive respective screws for fixing the supporting frame 2 to a box built into the wall, not shown in the figures.

The supporting frame 1 further includes means for attaching the frame 1 to a covering plate, not illustrated in the figures. In the embodiment shown in the figures, said attaching means are represented by, but not limited to, four attaching channels 21 suitable to receive respective fixing tongues provided in the covering plate.

The body of the supporting frame 2 is preferably made of insulating material, for example plastic, and is substantially frame-shaped. More preferably, said body has approximately the shape of a substantially plate-like frame such as, for exemplary but non-limiting purposes, a quadrangular plan with rounded corners. For exemplary purposes, the body of the frame 2 is illustrated with a substantially rectangular shape.

The body of the supporting frame 2 extends around a mounting window 22, defining a mounting seat suitable to receive and hold the electrical apparatus 1. In the embodiment shown, the mounting window 22 can receive modularly up to six electrical apparatuses 1 aligned beside each other.

The mounting window 22 is defined by a pair of fixing walls 23, 24 of the body of the frame 1 opposite each other. The mounting window 22 is further defined by a pair of connecting walls 25, 26 of the frame body, which have respective ends connected to the fixing walls 23, 24.

Each of the fixing walls 23, 24 includes a portion of wall with shaped projections, which extends axially along the mounting window 22. For the purposes of this description, axial direction will mean a direction z substantially perpendicular to an x-y plane parallel to the plane on which the opening of the mounting window 22 lies.

Preferably, said shaped projections (which in the figure are visible only on the fixing wall 24, but are also present on the opposite fixing wall 23) form together a continuous projecting element 27 which extends along a serpentine path to define a plurality of fixing elements formed of grooves 28 and connecting edges 29 arranged between adjacent grooves 28. In one preferred embodiment, the grooves 28 have a dovetailed cross-section and the connecting edges 29 have one inclined side which faces towards the side of the supporting frame 2 where the electrical apparatus is inserted.

Each of the grooves 29 is able to receive a respective fixing tongue 8, 9 of the electrical apparatus 1. In practice, each electrical apparatus of the type illustrated in FIG. 1, engages with four grooves 28 provided on the supporting frame 2, two of which are situated on the fixing wall 23 and two on the fixing wall 24. Obviously, an electrical apparatus 1 having a greater width (for example, equal to two modules of the DIN standard) can engage with the supporting frame 2 using a greater number (i.e. more than four) of fixing elements 8, 9 and grooves 28. It should be observed that, in practice, when the electrical apparatus 1 is attached to the supporting frame 2, the fixing elements 8, 9 and the grooves 28 constitute complementary snap-in fixing elements such as to allow guided axial sliding (direction z) of the electrical apparatus respect to the supporting frame 2 and to prevent movement of the electrical apparatus 1 parallel (x, y plane) to the mounting window 22. Obviously, it should be considered that the fixing tongues 8, 9 of the electrical apparatus 1 placed on the minor wall 3 are such as to engage with respective grooves 28 provided on the fixing side 23 of the supporting frame 2, which are not visible in FIG. 1.

The flexible tooth 10 is such as to engage with a respective connecting edge 29, for a snap and lock attachment of the electrical apparatus 1 to the supporting frame 2. It should be observed that, in practice, the flexible tooth 10 and the respective connecting edge 29 constitute complementary snap and lock fixing elements suitable to block, during attachment of the electrical apparatus 1 to the supporting frame 2, axial sliding between the electrical apparatus 1 and the supporting frame 2, once a predetermined snap and lock position has been reached.

In practice, during insertion of the electrical apparatus 1 into the mounting window 22, at first engagement of the complementary guiding fixing elements 8, 9, 28 takes place and then the apparatus 1 slides axially respect to the supporting frame 2, the tooth 10 bends and scrapes against the inclined wall of the connecting edge 29 until it surmounts said edge. In practice, once the tooth 10 has surmounted said edge, the snap-in attachment position is reached, where the end of the flexible tooth 10 engages with a substantially vertical surface (in the figure, direction y) of the connecting edge 29, facing the side of the supporting frame 2 which is facing the wall on which the frame 2 is intended to be installed.

Figure 2:
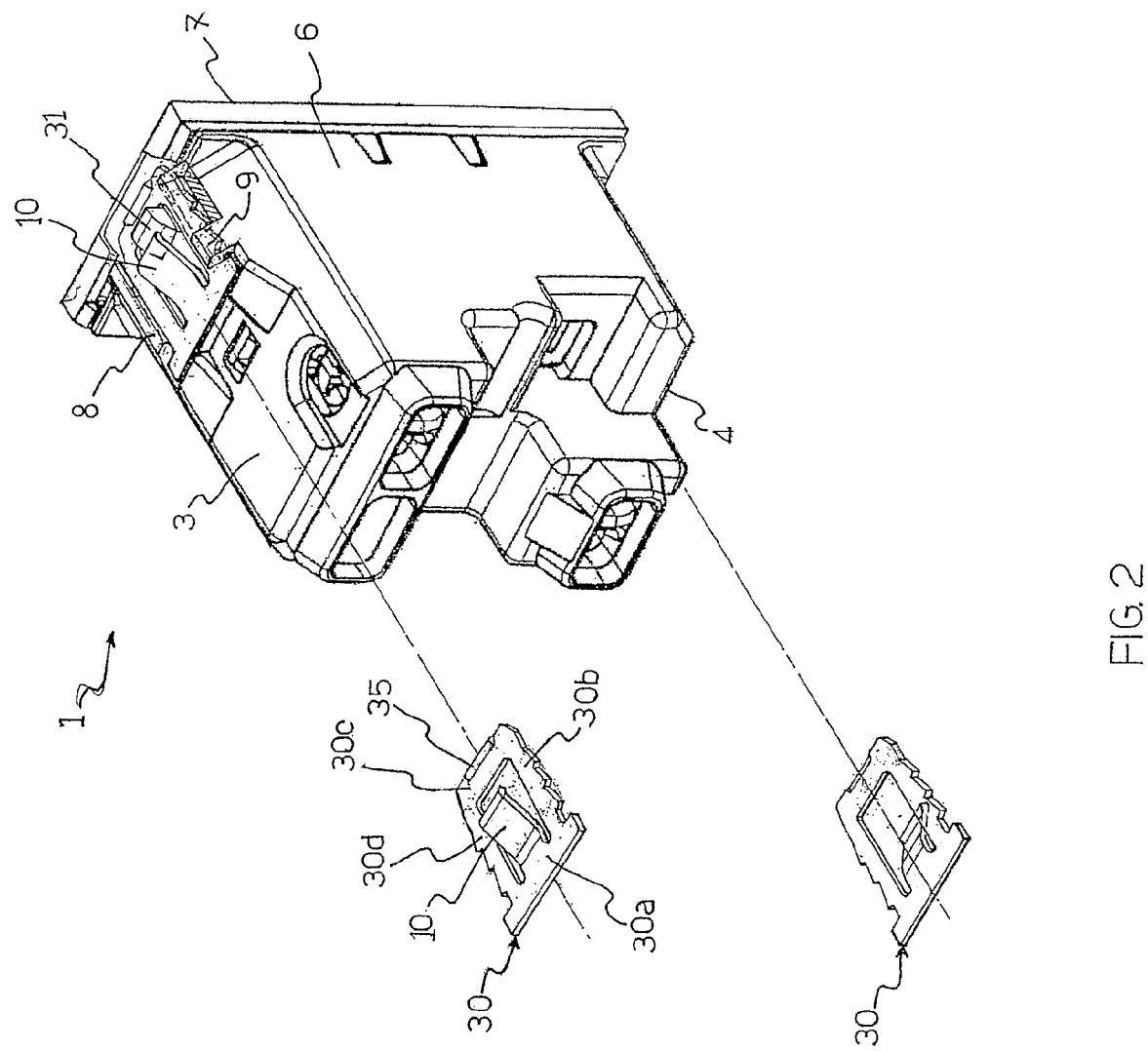
FIG. 2 is an axonometric view of the electrical apparatus in FIG. 1 with some parts of the apparatus detached.

As illustrated in FIG. 2, in a preferred embodiment, the flexible tooth 10 is a metal tooth forming part of a sheet element 30 which can be inserted, preferably by snap and lock, into a mounting seat defined between a pair of fixing tongues 8, 9. In FIG. 2, the fixing tongue 9 and the pushbutton 7 are shown partially in cross-section in order to illustrate how the sheet element 30 can be attached to the electrical apparatus 1.

Preferably, the sheet element 30 is obtained by shearing and bending of a steel sheet. More preferably, the sheet element 30 is a metal sheet including a base frame portion 30a, 30b, 30c, 30d intended to be inserted in the mounting seat of the sheet 30. The base frame portion 30a, 30b, 30c, 30d is composed of four sides, each pair parallel. One of said sides, i.e. side 30a, is connected to the flexible tooth 10. The side 30c opposite side 30a, during insertion of the sheet 30 into the mounting seat between the fixing tongues 8, 9, is intended to surmount a rigid tooth 31 which protrudes inside the mounting seat in order to block by snapping the sheet 30 to the electrical apparatus 1. Preferably, said side 30c has one part 35 slightly inclined compared to the plane on which the base portion 30a, 30b, 30c, 30d of the sheet 30 lies, in order to allow surmounting of the rigid tooth 31 during snap-in insertion of the sheet element 30 into the mounting seat between the fixing tongues 8, 9.

Preferably, the other two sides 30b, 30d of the sheet element 30 have an indented external edge so as to allow, advantageously, forced assembly of the sheet 30 inside the mounting seat so as to prevent unwanted dislodging.

Figure 3:
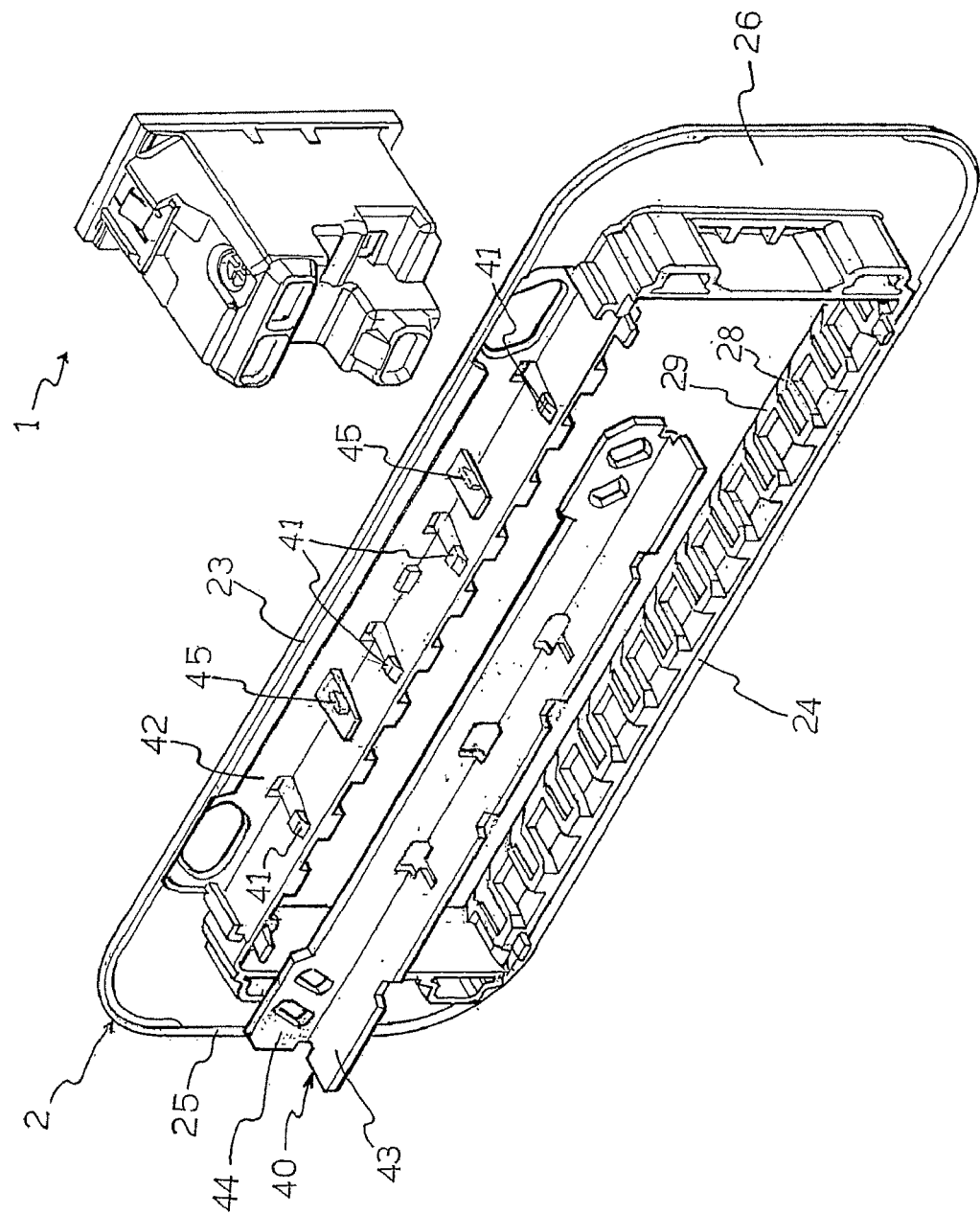
FIG. 3 is a further axonometric view of the array in FIG. 1 where the supporting frame has a detached accessory.

In FIG. 3, the electrical apparatus and the supporting frame 2 in FIG. 1 are illustrated in such a way as to show the rear part of the supporting frame 2. As shown in FIG. 3, in a preferred embodiment, especially in the case where the supporting frame 2 is made of plastic material and is intended to house a number of modular electrical apparatuses equivalent to a number of modules greater or equal to 4, the supporting frame 2 includes means to stabilize the distance between the fixing walls 23, 24. Preferably, said means include two L-shaped metal reinforcing bars 40 which extend substantially parallel to the fixing walls 23, 24. In FIG. 3 only one reinforcing bar 40 is visible, illustrated separate from the fixing wall 23. An identical reinforcing bar is however provided on the other fixing wall 24.

Preferably, the reinforcing bars 40 are made of metal profile bars bent at right angles and include two profile walls 43 and 44 substantially at right angles to each other. Preferably, said reinforcing bars 40 can be connected to respective fixing walls 23, 24, for example by means of snapping into special teeth 41, 45 provided on the fixing walls 23, 24 on the side of the supporting frame 2 intended to face the mounting wall.

In a particularly preferred embodiment, a wall 44 of the profile walls 43, 44 forming the reinforcing bar 40 is such that it can be received in a corresponding pocket 42 of the supporting frame 2 made in the thickness of a respective fixing wall 23, 24. This contrivance makes it possible to considerably reduce the possibility of any deformation of the reinforcing bar 40.

Figure 4:
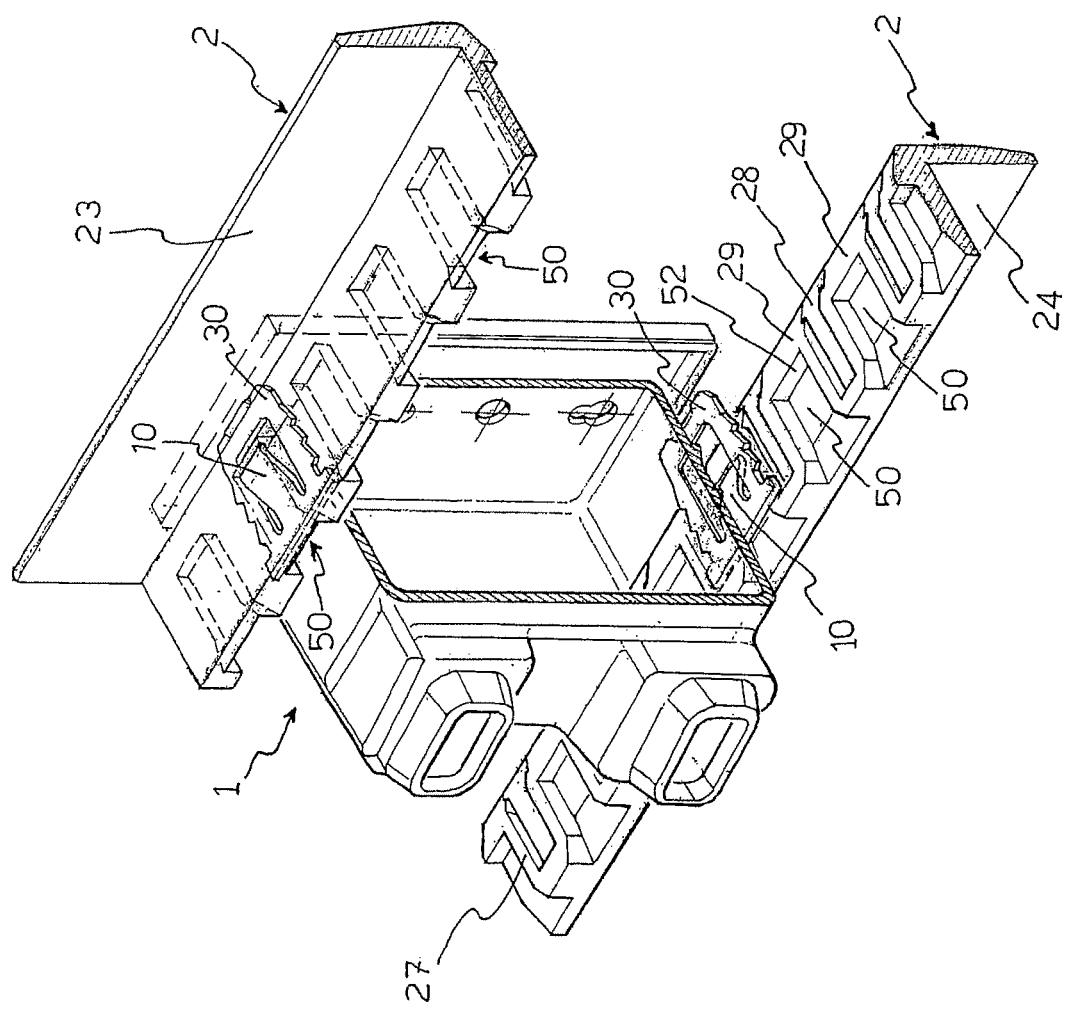
FIG. 4 shows a detail of the attachment system between the supporting frame and the electrical apparatus.

FIG. 4 schematically shows a partial prospective view, with some parts in cross-section and/or transparent, of an electrical apparatus 1 fixed to a supporting frame 2. In this example, the electrical apparatus 1, only illustrated schematically, is represented by an electrical socket. As can be seen in FIG. 4, in the snap-in position, each flexible tooth 10 of the electrical apparatus 1 engages with a respective connecting edge 29 belonging to the projecting element 27. In particular, it can be observed that the free end of the flexible tooth 10 engages with a surface 52 of the connecting edge 29 facing towards the side of the supporting frame 2 intended to face the wall. Moreover, it can be observed that the projecting element 27 defines two sets of grooves, of which the first set includes grooves 28 which are open, or facing, towards the front part of the supporting frame in order to receive the fixing tongues 8, 9 provided on the electrical apparatus 1, and of which the second set includes grooves 50 alternating with grooves 28 of the first set and open, or facing, towards the side of the supporting frame 2 intended to face the wall. In the snap-in position, these latter grooves 50 are such as to receive a respective flexible tooth 10.

Figure 5:
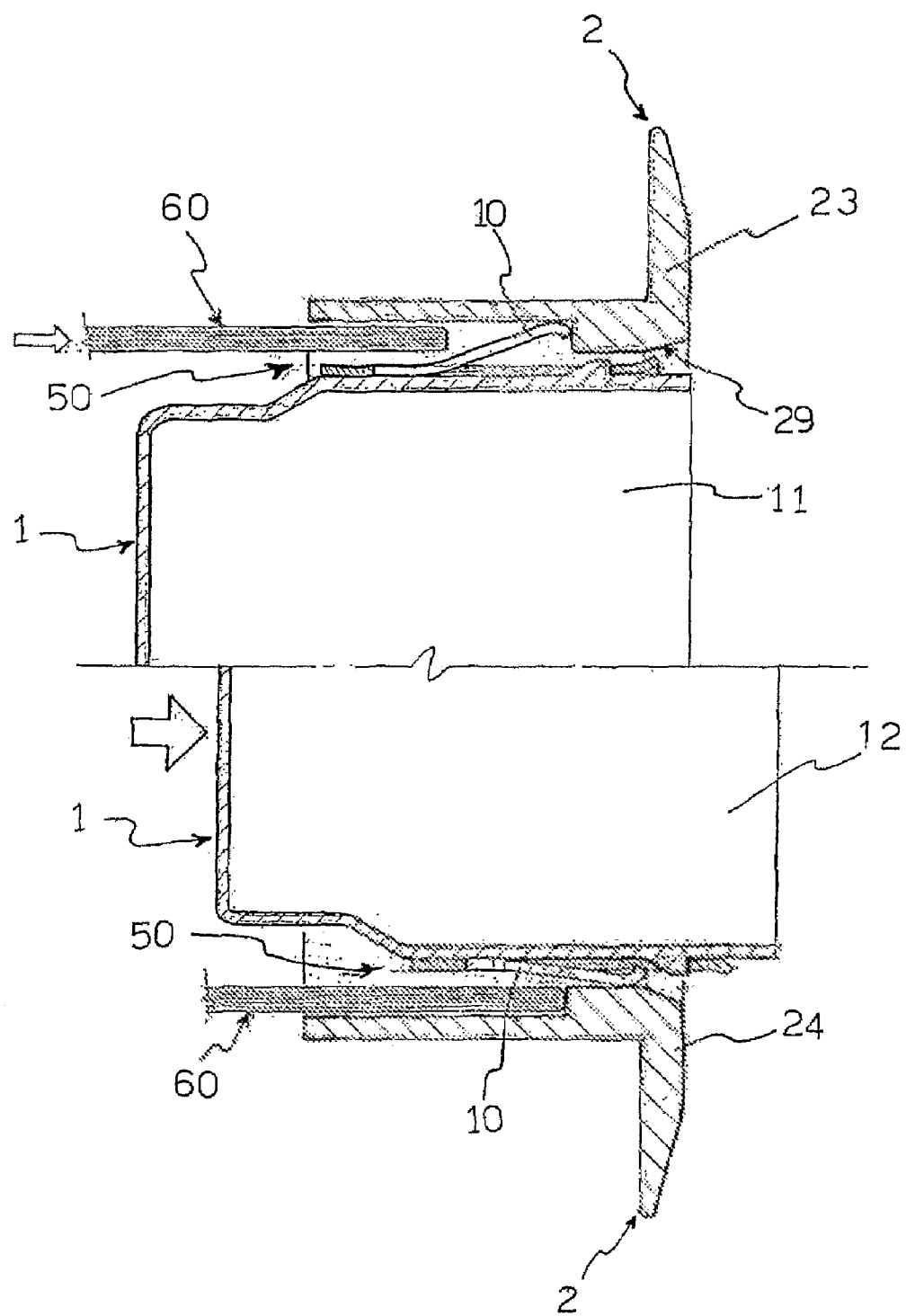
FIG. 5 schematically illustrates how the electrical apparatus is removed from the supporting frame.

As can be seen better in FIG. 5, advantageously the second set of grooves 50 is such as to receive a tool 60 which can be inserted wedge-like into said grooves 50 and from the rear side of the supporting frame 2 (i.e. the side intended to face the mounting wall of the supporting frame 2), in order to release the flexible tooth 10 from the connecting edge 29. In particular, FIG. 5 schematically shows an electrical apparatus 1 divided into two portions 1.1, 1.2, of which the upper portion 1.1 is connected to the supporting frame 2, before insertion of the wedge-like tool 60 into the groove 50, and of which the lower portion 1.2, partially extracted from the supporting frame 2, has, as a result of insertion of the tool 60, the flexible tooth 10 released from the supporting frame 2. Obviously, it should be considered that the representation in FIG. 5 is only illustrative and that, in reality, the portions 1.1 and 1.2 of an electrical apparatus cannot be separated and are rigidly bound to each other.

On the basis of the above description, therefore, it is possible to comprehend how an electrical apparatus 1 and a supporting frame 2 according to the present invention can easily be attached to/detached from each other.

Moreover, it should be observed that, providing a flexible tooth 10 in sheet metal on the electrical apparatus 1, makes it possible to obtain reliable fixing of the electrical apparatus 1 to the supporting frame 2, without however excessively overstraining the structural parts which guarantee fixing of the electrical apparatus 1 to the supporting frame 2 during the attachment/detachment operations between the two parts.

It should be further observed that, advantageously, providing a flexible tooth 10 with one curved end, makes it possible for said tooth not to be wedged against the connecting edge 29 during removal of the electrical apparatus 1 from the supporting frame 2.

Furthermore, providing reinforcing bars 40 on the supporting frame 2 in order to stabilize the distance between the fixing walls 23, 24 of the supporting frame 2, makes it possible to advantageously guarantee excellent attachment between the frame 2 and the electrical apparatuses, even when the supporting frame 2 includes a mounting window 22 able to house a large number of modular electrical apparatuses (for example, four or more one-module electrical apparatuses).

Naturally, in order to satisfy contingent and specific requirements, a person skilled in the art may apply to the above-described electrical apparatus 1 and supporting frame 2 according to the invention many modifications and variations, all of which, however, are included within the scope of protection of the invention as defined by the following claims.

The invention claimed is:

1. Electrical apparatus which can be fixed to a supporting frame provided with a mounting window to receive said electrical apparatus, the electrical apparatus comprising:
   a main body having a substantially box-like shape; and
   first fixing elements provided on first and second opposite sides of said box-like main body to engage corresponding second fixing elements provided on said frame, said first fixing elements including:
      guiding fixing elements to allow axial and guided sliding of said electrical apparatus with respect to said frame in inserting said apparatus into said mounting window; and
      snap-in fixing elements to block said axial sliding of said electrical apparatus with respect to said frame once a predetermined snap-in position has been reached,
   wherein said supporting frame has a substantially frame-like body surrounding said mounting window and includes a pair of opposite fixing walls, said second fixing elements include a projecting element on said fixing walls, and said snap-in fixing elements include a flexible tooth having one end attached to said box-like main body and a second opposite free end suitable to engage, in said predetermined snap and lock position, with said projecting element.

2. Electrical apparatus according to claim 1, wherein said guiding fixing elements include for each said opposite side of the box-like main body two inclined and distanced fixing tongues, and wherein said flexible tooth is fixed in a mounting seat defined between said tongues.

3. Electrical apparatus according to claim 2, wherein said projecting element is a continuous projecting element which extends along a serpentine path to define a plurality of attaching elements formed by grooves and connecting edges alternating between adjacent grooves, and wherein:
   said fixing tongues are such that they can be received in a respective groove; and
   said flexible tooth is such that it can engage with and snap in against said connecting edge.

4. Supporting frame for wall mounting of an electrical apparatus, the frame including a substantially frame-shaped body, extending around a mounting window including a pair of fixing walls wherein said fixing walls are adapted to receive an electrical apparatus according to claim 3 in said mounting window and keep it attached to said frame.

5. Supporting frame according to claim 4, further including a pair of reinforcing bars for stabilizing a distance between said fixing walls.

6. Electrical apparatus according to claim 2, wherein said flexible tooth can be fixed by a snap-in mechanism to said mounting seat.

7. Electrical apparatus according to claim 6, wherein said sheet metal is sheet steel.

8. Electrical apparatus according to claim 2, wherein said flexible tooth is facing a direction opposite to the direction of axial insertion of said electrical apparatus into said mounting window.

9. Electrical apparatus according to claim 2, wherein said second end of the flexible tooth is a curved end.

10. Electrical apparatus according to claim 2, wherein said flexible tooth is made of sheet metal.

11. Supporting frame for wall mounting of an electrical apparatus, the frame including a substantially frame-shaped body, extending around a mounting window including a pair of fixing walls wherein said fixing walls are adapted to receive an electrical apparatus according to claim 2 in said mounting window and keep it attached to said frame.

12. Supporting frame according to claim 11, further including a pair of reinforcing bars for stabilizing a distance between said fixing walls.

13. Supporting frame for wall mounting of an electrical apparatus, the frame including a substantially frame-shaped body, extending around a mounting window including a pair of fixing walls, wherein said fixing walls are adapted to receive an electrical apparatus according to claim 1 in said mounting window and keep it attached to said frame.

14. Supporting frame according to claim 13, further including a pair of reinforcing bars in metal profile for stabilizing a distance between said fixing walls.

15. Supporting frame according to claim 14, wherein each of said reinforcing bars is L-shaped and extends substantially parallel to said fixing walls.

16. Electrical apparatus according to claim 1, wherein said projecting element is a continuous projecting element which extends along a serpentine path to define a plurality of attaching elements formed by grooves and connecting edges alternating between adjacent grooves and wherein:
    said fixing tongues are such that they can be received in a respective groove; and
    said flexible tooth is such that it can engage with and snap in against said connecting edge.

17. Supporting frame for wall mounting of an electrical apparatus, the frame including a substantially frame-shaped body, extending around a mounting window including a pair of fixing walls wherein said fixing walls are adapted to receive an electrical apparatus according to claim 1 in said mounting window and keep it attached to said frame.

18. Supporting frame according to claim 17, further including a pair of reinforcing bars for stabilizing a distance between said fixing walls.

* * * * *